Patented Dec. 2, 1924.

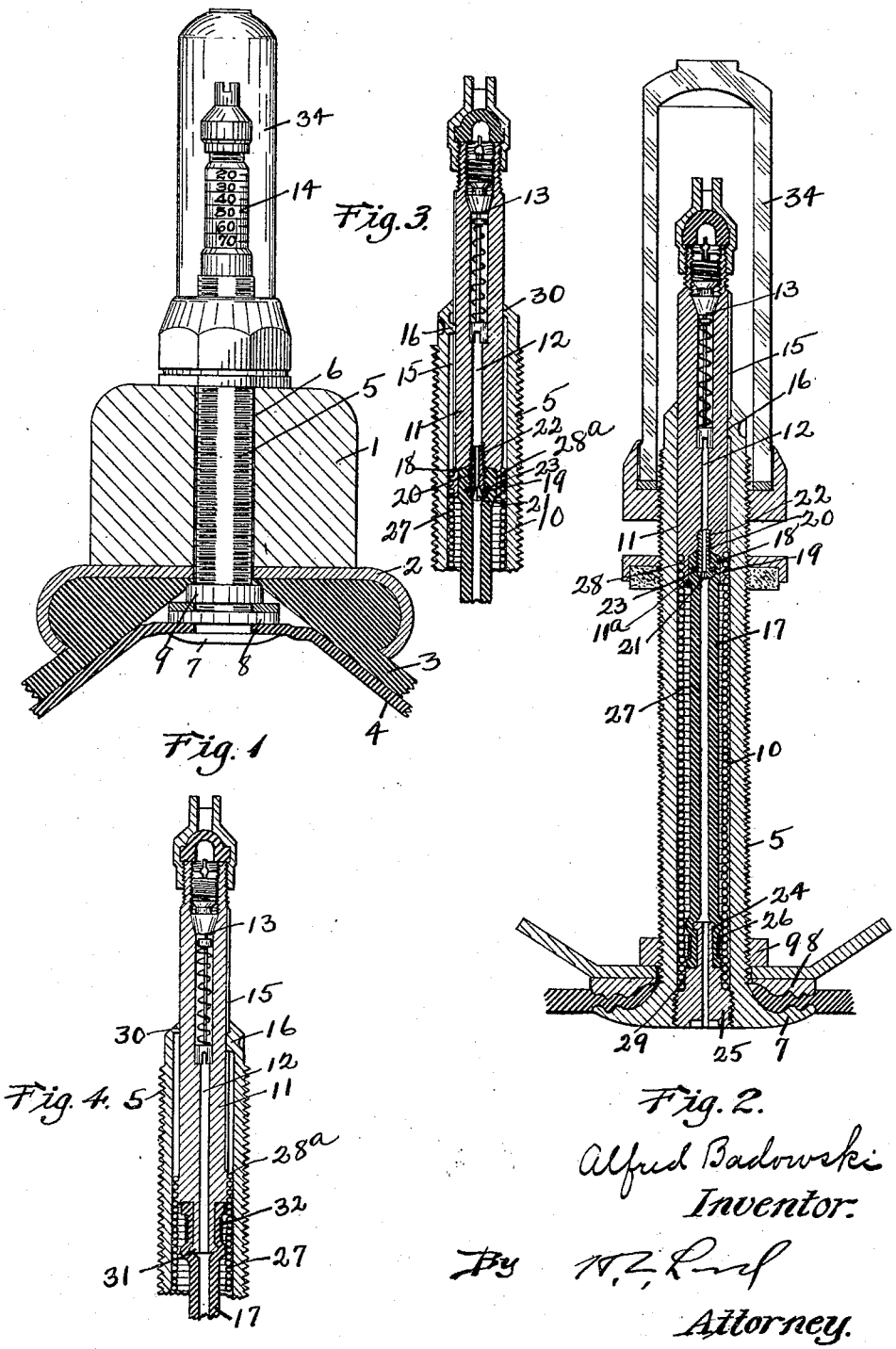

1,517,484

UNITED STATES PATENT OFFICE.

ALFRED BADOWSKI, OF CHARLESTON, WEST VIRGINIA, ASSIGNOR TO TIROMETER VALVE CORPORATION OF AMERICA, OF CHARLESTON, WEST VIRGINIA, A CORPORATION OF WEST VIRGINIA.

PRESSURE GAUGE FOR PNEUMATIC TIRES.

Application filed July 15, 1921. Serial No. 484,857.

*To all whom it may concern:*

Be it known that I, ALFRED BADOWSKI, a citizen of the United States, residing at Charleston, in the county of Kanawha and State of West Virginia, have invented new and useful Improvements in Pressure Gauges for Pneumatic Tires, of which the following is a specification.

Pressure gauges for pneumatic tires comprise a stem which is necessarily reduced in diameter due to the fact that it must extend through an opening in the felloe. The pressure gauge of the present invention involves a hollow stem in which there is a movable plunger responsive to pressures within the stem indicating by its movement the pressure o which it is subjected. An elastic tube maintains communication between the plunger and the tire tube and the movement of the plunger is resisted by a spring. The present invention relates more particularly to the manner of securing the elastic tube and spring to the plunger. Further details of construction will appear from the specification and claims.

The invention is illustrated in the accompanying drawings as follows:—

Fig. 1 shows a section of a wheel rim with the pressure gauge in place.

Fig. 2 a central section through the pressure gauge.

Fig. 3 a section of a portion of the gauge varying in structure somewhat from that shown in Fig. 2.

Fig. 4 a similar view also varying somewhat in its structure from that shown in Fig. 2.

1 marks the felloe, 2 the rim, 3 the tire, 4 the tire tube, 5 a stem which extends through an opening 6 in the felloe, 7 a head on the stem, 8 a washer clamping the tube on the head 7 and 9 a nut screwed on to the stem 5 and operating on the washer 8.

The stem has an opening 10 extending through it and a plunger 11 is mounted in this opening. The plunger has an opening 12 extending through it in which is arranged the usual inflation valve 13. The plunger is provided with a scale 14 indicating varying pressures. The plunger also has a slot 15 in which a key 16 operates to prevent the turning of the plunger. An elastic tube 17 forms a means of communication between the plunger and the inner end of the stem. It is provided with an annular rib 18 at its upper end with a neck 19 with reduced cross section immediately back of the rib. A screw 20 having its head disposed in the tube 17 and back of the rib 18 extends into a screw-threaded opening 22 in the end of the plunger. This screw has an opening extending through it, the outer end of which is squared at 21 so that the screw may be operated from the inner end of the tube. A washer 23 is arranged between the head of the screw and the rib 18 so that the screw may be turned freely. In order to prevent the stretching of the annular rib 18 over the head of the screw I provide a sleeve 11ª on the end of the plunger extending over the tube and past the neck 19 so that the tube can only be displaced from the screw by drawing the rib through the space between the head of the screw and the extension.

The inner end of the tube is secured on a nipple 24 extending from a plug 25 screwed into the stem. The tube is secured on the nipple by twine or wire binding 26. A spring 27 is screwed on to screw threads 28 on the outer surface of the extension or sleeve 11ª. The lower end of the spring is screwed on to the plug 25 at 29.

In the variation shown in Fig. 3 the threads 28ª corresponding to the threads 28 have their bases equal in diameter to the plunger 11 so that the spring when screwed on to these threads form a shoulder adapted to engage an internal shoulder 30 on the stem should the parts resisting the movement of the plunger become broken.

In Fig. 4 the plunger is provided with a nipple 31 on which the elastic tube 17 extends and is secured by a wrapping or binding 32. A screw thread 28ª having a base of a diameter equal to the plunger is also provided, the spring being screwed on to this in a manner similar to that employed in the construction shown in Fig. 3.

A transparent cap 34 is provided within which the plunger operates.

What I claim as new is:—

1. In a pressure gauge for pneumatic tires, the combination with a stem adapted to be connected to a tire tube of a valved plunger in the stem connected to and responsive to pressure within a tire; a spring extending over the end of the plunger and resisting the movement of the plunger, said spring having a diameter greater than the plunger and forming a shoulder; and a stop on the stem adapted to engage the shoulder formed by the spring.

2. In a pressure gauge for pneumatic tires, the combination with a stem adapted to be connected to a tire tube of a valved plunger in the stem connected to and responsive to pressure within a tire, said plunger having a threaded lower end, the peaks of the threads having a greater diameter than the plunger; and a spring extending over the end of the plunger and secured to said threads.

3. In a pressure gauge for pneumatic tires, the combination with a stem adapted to be connected to a tire tube of a valved plunger in the stem connected to and responsive to pressure within a tire, said plunger having a threaded lower end, the peaks of the threads having a greater diameter than the plunger; a spring extending over the end of the plunger and secured to said threads, said spring having a diameter greater than the plunger and forming a shoulder; and a stop on the stem adapted to engage the shoulder.

In testimony whereof I have hereunto set my hand.

ALFRED BADOWSKI.